United States Patent [19]

Underhill et al.

[11] 4,398,346

[45] Aug. 16, 1983

[54] METHOD FOR LITHIUM ANODE AND ELECTROCHEMICAL CELL FABRICATION

[75] Inventors: Lloyd J. Underhill, Brooklyn Park; William D. Helgeson, Minneapolis, both of Minn.

[73] Assignee: Medtronic, Inc., Minneapolis, Minn.

[21] Appl. No.: 314,210

[22] Filed: Oct. 23, 1981

[51] Int. Cl.³ ..................... H01M 6/14; H01M 4/04
[52] U.S. Cl. ........................... 29/623.5; 427/58; 427/384; 29/623.1
[58] Field of Search ............. 29/623.1, 623.5; 429/191, 192, 197, 199, 213, 215, 218; 427/58, 384

[56] References Cited

U.S. PATENT DOCUMENTS

| | | | |
|---|---|---|---|
| 3,674,562 | 7/1972 | Schneider et al. | 429/192 |
| 3,957,533 | 5/1976 | Mead et al. | 429/213 |
| 4,182,798 | 1/1980 | Skarstad | 29/623.1 |
| 4,203,201 | 5/1980 | Mead et al. | 29/623.1 |

*Primary Examiner*—Lowell A. Larson
*Assistant Examiner*—Jonathan L. Scherer
*Attorney, Agent, or Firm*—Everett J. Schroeder; Kenneth D. Siegfried; Robert O. Vidas

[57] ABSTRACT

Method of preparing lithium anodes contacted with organic materials prior to association of the anode with a cathode material wherein the contacted anode is first subjected to a heat treatment. Upon incorporation of the improved anode into an electrochemical battery or cell and association of the heat treated anode with a suitable cathode material, the cell may be discharged under controlled conditions for a short time prior to its usual "burn-in" discharge.

61 Claims, 3 Drawing Figures

METHOD FOR LITHIUM ANODE AND ELECTROCHEMICAL CELL FABRICATION

DESCRIPTION

BACKGROUND OF THE INVENTION

This invention relates generally to lithium anode assemblies and to electrochemical batteries or cells incorporating such anode assemblies.

Lithium anode assemblies are used in electrochemical batteries in combination with various cathode materials. For the purposes of this invention, the most preferred cathode materials are comprised of charge-transfer-complexes which are the reaction product of an organic component and a halogen component. For example, such a cathode material may comprise the reaction product of a polyvinylpyridine polymer and a halogen. Specifically, the reaction product of poly-2-vinylpyridine and iodine are most preferred. 4-vinylpyridine polymer may also be used in place of or in addition to 2-vinylpyridine polymer. Other cathode materials such as those described in U.S. Pat. No. 3,352,720 to Wilson et al, U.S. Pat. No. 3,660,163 to Moser, U.S. Pat. No. 3,660,164 to Hermann et al and U.S. Pat. No. 3,674,562 to Schneider et al may also be used.

Although the most preferred halogen component is iodine, bromine and interhalogens such as iodine monobromide and the like may also be used for the cathode.

It should be understood that the various initial component materials referred to herein with respect to the cathode are described with reference to their identity as initially introduced into the pertinent preparation step. A wide variety of chemical interreactions may occur between various initial components of the cathode, depending on the preparation used, which render the resultant reaction products difficult to describe.

In electrochemical batteries of the type described herein, the electrochemical reaction occurs between the lithium anode and the halogen component of the cathode material. For example, if the halogen component is iodine, a solid electrolyte of lithium iodide will form in situ from the interaction of the halogen component of the cathode material with the metallic lithium anode. Electrochemical batteries of this type have found use as in power sources for implantable cardiac pacemakers.

In fabricating these batteries, some manufacturers contact the lithium anode, at least on the operative surface or surfaces thereof, with an organic material of the type utilized in the cathode. The prevalent contact arrangement is by way of coating the lithium anode at least on its operative surface or surfaces with the organic material in one or more layers. In cells having such coatings, preferably but not necessarily, the same organic material as is used in the cathode of the cell is used for the coating (in the sense that the initial materials may be the same).

A typical procedure for coating the lithium anode involves the painting thereon of a solution of the donor material. For example, poly-2-vinylpyridine dissolved in a suitable solvent such as benzene may be painted onto the anode. The subsequent evaporation of the solvent leaves the polymer remaining on the anode in the form of a coating. Multiple layers may be painted onto the anode to provide any desired coating thickness. U.S. Pat. Nos. 3,957,533; 4,071,662 and 4,117,212 to Mead et al describe such coated lithium anodes. The coating described therein is of an organic material preferably of a polyvinylpyridine polymer and in particular 2-vinylpyridine polymer. Additionally, 4-vinylpyridine and 3-ethyl 2-vinylpyridine polymers are described for the coating. The subject matter of these patents is incorporated herein by reference.

The coating of organic material is believed to result in a greater utilization of the surface of the lithium anode element by the cathode material of the battery and a reduction of cell impedance.

Another means of contacting the lithium anode operative surface with an organic material is described in U.S. Pat. No. 4,182,798 to Skarstad. In accordance with that patent, poly-2-vinylpyridine in self-supporting sheet-like form is positioned against the operative anode surface or surfaces and caused to adhere thereto by means of adhesive, pressure or the like. The subject matter of this patent is also incorporated herein by reference.

In fabricating an electrochemical cell or battery utilizing a coated or otherwise "contacted" lithium anode, the anode is placed in a suitable container with other cell components. The container is of a material which is non-reactive with the cell components and is molded or otherwise formed to a desired configuration. the cell components comprise mainly the lithium anode suitably positioned within the container and a cathode material of the type described hereinabove, preferably the reaction product of polyvinylpyridine and a halogen, the halogen most preferably being iodine. The cathode material operatively contacts the anode through the anode coating. The exact mechanism by which the halogen-containing cathode material and lithium come into operative contact through the coating is not known. However, the halogen, for example, iodine, of the cathode material reacts with the lithium of the anode to form the solid lithium iodide electrolyte in situ between the anode and cathode components.

It is desirable from the standpoint of battery capacity that the cathode material contain relatively large effective amounts of the halogen component relative to the organic component. For example, in the case of lithium iodine batteries utilizing cathode materials comprised of the reaction product of poly-2-vinylpyridine and iodine, a 20:1 initial ratio of iodine to poly-2-vinylpyridine as initially combined to prepare the cathode material has become more or less a standard for commercial production. It is desirable that the initial ratio be increased to 30:1, 50:1 and even 100:1 or higher where possible. The major advantage expected from such a change is a significant increase in deliverable capacity over 20:1 cathode units. However, in actual practice, the significant increase in deliverable capacity with higher weight ratios of halogen, iodine in particular, have not been fully achieved. One reason for this is that the higher weight ratio batteries have been found to be more susceptible to self-discharge than the lower weight ratio batteries. Self-discharge directly affects battery capacity detrimentally. Higher initial electrical impedance is also a problem with higher weight ratio batteries.

In most instances, the cells described herein will be assembled and encapsulated in a dry atmosphere, suitably in dry rooms or enclosures having a relative humidity less than about two percent, using substantially anhydrous and/or dried components. All of the components, cells and tests of cells described herein were prepared and performed substantially in such dry rooms. In production embodiments, the cells of the invention will preferably be enclosed in hermetically sealed enclosures such as welded stainless steel containers with appropriate electrical feedthrough arrangements for electrically contacting the cell components, as is known in the art. The assembly and encapsulation of such cells preferably is accomplished in a dry room using substantially anhydrous and/or dried components.

SUMMARY OF THE INVENTION

This invention provides processing procedures in the preparation of lithium anodes and in the fabrication of electrochemical batteries or cells utilizing the coated or otherwise contacted lithium anodes which minimize the tendency toward self-discharge and decrease initial impedance. A direct consequence of such improvements is that the batteries exhibit higher capacities than has been possible heretofore, particularly at the higher weight ratios of the cathode material. Longer shelf-life and more consistent burn-in impedance data are also advantages accruing to this invention.

Briefly, the invention comprises two aspects. First, the lithium anode following contact with the organic material whether by means of a coating, a self-supporting sheet-like form or otherwise, is heated to a temperature in excess of about 260° F. but below the melting temperature of the organic material. Preferably, the contacted anode element is held at the heating temperature for a time and then cooled. Following cooling, the anode is incorporated into the battery structure, associated with cathode material and the battery assembly is otherwise completed. Such batteries may be subjected to a burn-in procedure before actual use. A typical burn-in procedure involves discharge of the battery across a resistance on the order of 1,000 ohms or higher i.e., a relatively high resistance for a period of several hours. The second aspect of this invention lies in a modified discharge step which is applied prior to the burn-in discharge, if burn-in is used. It may also be applied to the battery with advantage if the burn-in discharge is not used. The modified discharge step contemplates discharge of the battery across a much lower resistance, 0.1 to 0.2 ohms being optimum, for a much shorter time, about one hour being optimum, then is utilized for the burn-in discharge procedure.

DETAILED DESCRIPTION OF THE INVENTION

Figures 1, 2:
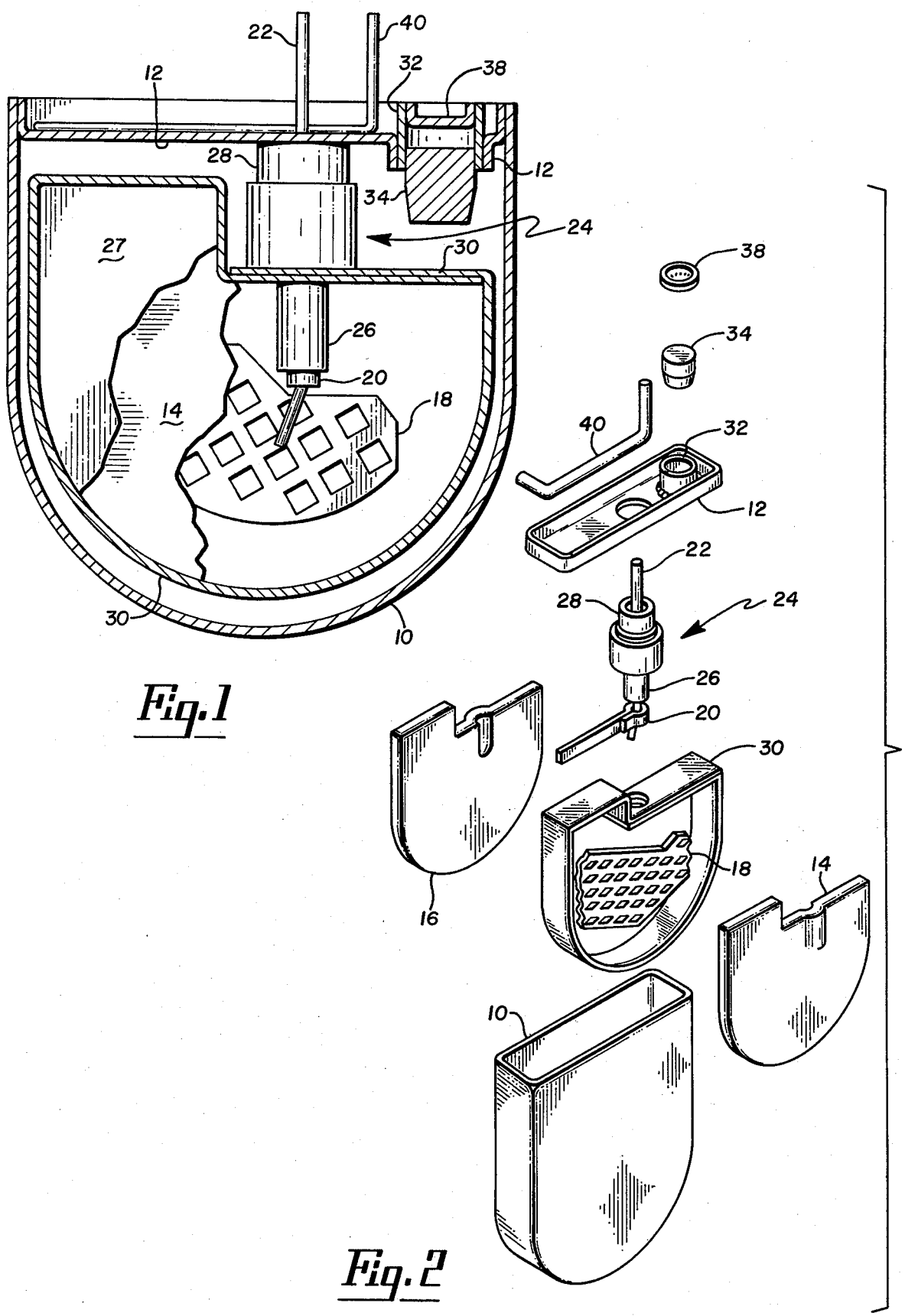
FIG. 1 is a side elevational view of a lithium-halogen cell with parts removed for illustrating the invention.
FIG. 2 is an exploded view of the cell of FIG. 1.

Referring now to the Figures, a lithium-halogen battery, typical of the batteries which may make use of the invention, is illustrated. The battery comprises a casing 10 of metal such as stainless steel. Casing 10 has an open top or end which is closed by means of a lid 12, also of stainless steel. The cell further includes anode means comprising a pair of lithium elements or plates 14 and 16 having an anode current collector element 18 sandwiched or enclosed therebetween. Current collector 18 is a relatively thin element of nickel or zirconium mesh. A conductor lead 20 of nickel or other suitable metal is spot welded to collector element 18 and an electrical lead 22 which may be of nickel or other suitable metal is welded at one end to lead 20 and it is of sufficient length to extend out of the casing for making an external electrical connection thereto. Conductor 22 is sealed from the remainder of the cell contents by means including an insulator element generally designated 24 which surrounds lead 22 and has a first portion 26 which is sandwiched between lithium plates 14 and 16 and a second body portion 28 which is cylindrical and located between the lithium plates and lid 12 when the cell is assembled as shown in FIG. 1. Insulator 24 is of a material which in addition to being a non-conductor of electricity is also non-reactive with the contents of the cell, such as the halogen cathode materials utilized in the cell illustrated. One form of material found to perform satisfactorily are the fluoropolymers, such as the one available under the Tradename "Halar", a trademark of the Allied Chemical Company. Other non-reactive materials may be used for insulator 24.

The anode assembly comprising the lithium elements 14 and 16 and current collector 18 is fitted within an anode holding or retention means comprised of a peripheral frame member in the form of a band 30 which peripherally encloses the anode assembly leaving the major surface areas of the lithium elements exposed. Band 30 is preferably of the aforementioned fluoropolymer material or any similar material which is non-reactive with the cell contents. In the present illustration, band 30 surrounds the peripheral edges of the lithium elements or plates 14 and 16 engaging the peripheral contact surfaces provided at the joint area therebetween. The opposite ends of band 30 are provided with apertures of a size sufficient to receive the insulator portion 26. These ends are overlapped adjacent the insulator as shown in FIG. 1 to provide a wrap-around structure.

In an illustrative method of forming the anode assembly, first a subassembly including lead 22 within insulator 24 is provided. Band 30 is then assembled into place with the ends overlapped to align the openings therein which then are fitted onto insulator portion 28. The overlapping ends joined to insulator portion 28 can be sealed in place with a suitable cement which is non-reactive with cell contents, such as a cyanoacrylate cement commercially available as Permabond 101. Current collector 18, conducting strip 20 and the end of lead 22 are spot welded together whereupon the lithium plates 14 and 16 are positioned within band 30 on opposite sides of the collector element 18 and insulator portion 26. This assembly is then placed within a suitable fixture or support and is pressed together with a suitable force, for example about 3000 pounds. The collector 18, strip 20, insulator portion 26 and the portion of lead 22 contained therein are sealed within the lithium elements 14 and 16 due to the bonding therebetween inside lithium band 30 with the result that the peripheral juncture at the edges of lithium elements 14 and 16 is enclosed and sealed. The completed anode assembly thus has two operative, exposed lateral electrode surfaces which are oppositely directed or disposed.

When the anode subassembly is completed it is contacted with a suitable organic material as previously described hereinabove. For example, it may be provided with the organic coating 27 as described above and shown in FIG. 1. The subassembly is then positioned in casing 10 as shown in FIG. 1 with the anode operative surfaces spaced from the inner surface of the casing.

The lithium may be contacted with the organic at any other convenient point in the fabrication of the cell. Lid 12 is then welded to casing 10 to provide yet another subassembly. Spacing between the anode and casing is important in this particular cell embodiment since casing 10 is the current collector for the cathode.

This subassembly is then heat treated as follows. Generally, the anode/organic material must be heated in excess of about 260° F. The upper temperature limit is the melting point of the organic material. A preferred temperature range is between about 260° F. and about 310° F. Even more preferred is a temperature of about 295° F.±about 10° F. with 285° F. being most preferred.

It is also preferred that the anode be held at the heating temperature for a time. It has been determined that a time period of about one hour is satisfactory although two or three hours may also be used; two hours ±15 minutes is most preferred at the preferred temperature of 295° F.±10° F.

The anode may be heat treated anytime following coating or other contacting with the organic material up to the time the cathode material is associated with the anode.

Figure 3:
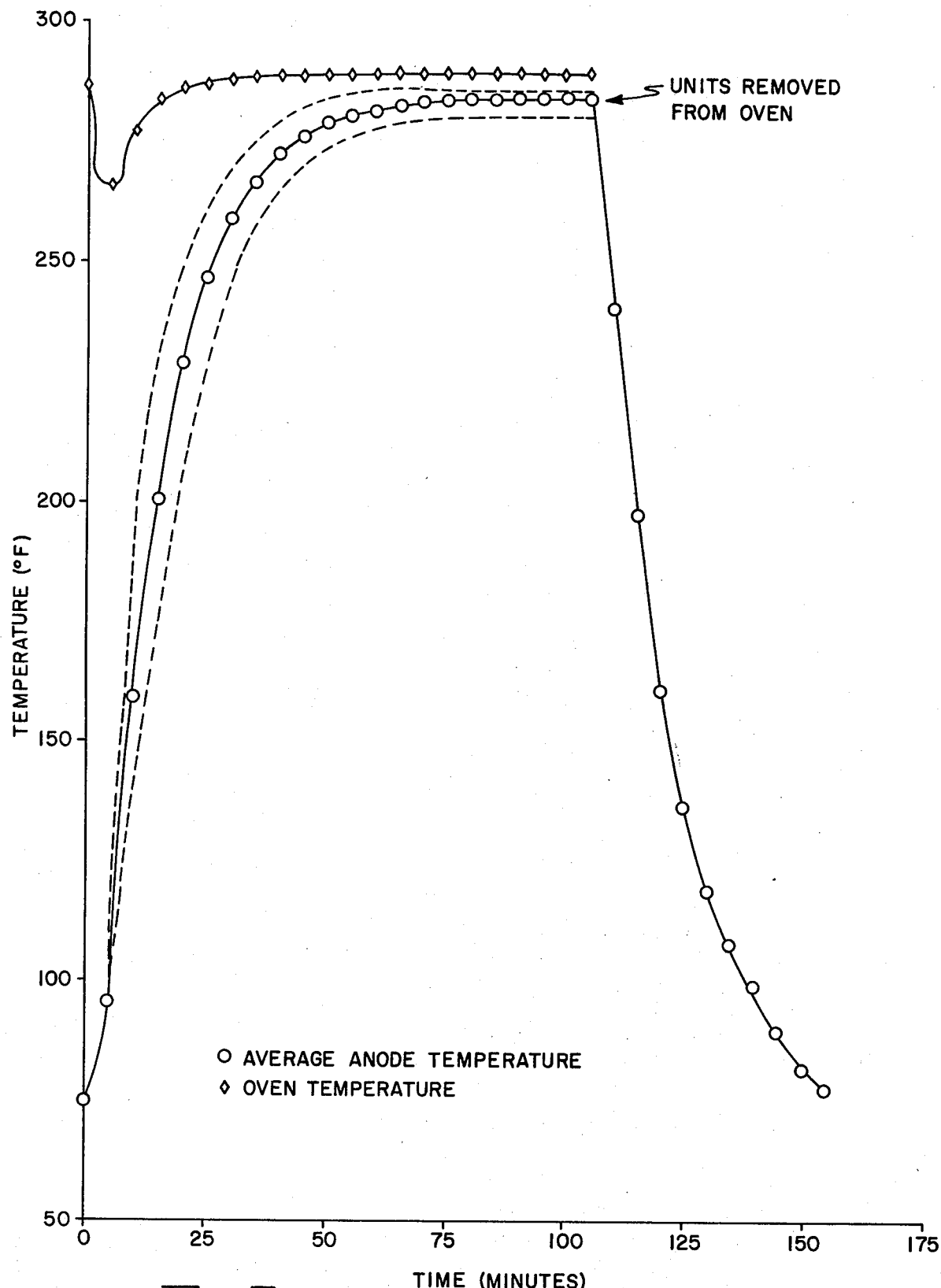
FIG. 3 is a graph showing a typical anode temperature profile during heat treatment in a conventional forced air oven.

A typical example of a preferred embodiment includes a 13 g. anode having about 75 mg. of poly-2-vinylpyridine coated on the operative surfaces thereof. A subassembly of the type described above including a cell casing was placed in a conventional forced air oven stabalized at 295° F. The subassembly took about 45 minutes to reach temperature. It was then allowed to heat soak for about one hour, stabalizing at 295° F. The total heat time was one hour 45 minutes. The anode subassembly was removed from the oven and allowed to cool to room temperature which took approximately one hour. Subassembly and oven temperatures were monitored with thermocouples. An anode temperature profile of typical oven temperatures is shown in FIG. 3.

Following heat treatment, the anode subassembly may then be filled with suitable cathode material. For example, halogen cathode material such as iodine or bromine containing some organic material, as is known in the art, may then be heated to melting and poured through a suitable opening 32 in lid 12 to fill casing 10 and operatively contact the exposed surfaces of the lithium anode. Delay times between heat treatment and cathode pouring are not critical. Delay times of 1, 5, 24 hours and 3 and 7 days were tested. During delay, the parts and components were stored in a 1 percent dry room where fabrication also takes place. A suitable cathode material may be prepared by heating the organic material, such as poly-2-vinylpyridine, mixed with iodine, to a temperature greater than the crystallization temperature of iodine, for example about 300° F. The amount of iodine is preferably greater than about 30:1 by weight ratio of the resulting mixture to provide sufficient cell capacity. Preferably, the ratio is 50:1, 100:1 or even higher. The resulting mixture upon heating may be poured into casing 10 of the subassembly when held in an upright position. The amount of constituents and material introduced into the casing is sufficient to contact the lateral surfaces of lithium elements 14, 16 and to reach a level at or adjacent the interior surface of lid 12.

The opening in lid 12 is then hermetically sealed with a series of plugs such as Teflon plug 34, and stainless steel plug 38 as shown. Stainless steel plug 38 is welded in place to provide a hermetic seal.

After the battery is completely assembled, it may then be subjected to a low resistance discharge at room temperature. If the battery is to be subjected to the ordinary high resistance burn-in procedure, the low resistance discharge step is completed first. The low discharge may for example be across a 0.1–0.2 ohm resistance for about one hour. Basically, it amounts to a short. Generally, the resistance should be of a predetermined value lower than that used for the relatively high resistance burn-in discharge eg., 1 Kohm or greater and for a predetermined time which is shorter than the high resistance burn-in time of several hours or so. The result is that a preliminary discharge at a higher rate is provided prior to burn-in which discharges at a lower rate.

Batteries receiving such treatment exhibit reduced micro watt heat output, reduced battery post burn-in impedance and increased deliverable battery capacity as compared to batteries which do not receive such treatment. The improvements are significantly greater in the higher rate ratio batteries eg., those having 50:1 and 100:1 weight ratio cathodes.

Batteries exhibit these improvements to some degree when only heat treated without the low resistance discharge. However, it is preferred that the low resistance discharge be used to obtain the full advantages of the invention with or without the more usual higher resistance burn-in. Delay times between low resistance discharge and high resistance discharge burn-in do not appear to be significant. Delays of up to 5 days had no effect.

In the particular embodiment illustrated casing 10, being of electrically conducting material, serves as a cathode current collector in direct contact with the cathodic contents of casing 10. Consequently, an electrical lead 40 may be attached directly to casing 10 for cathodic contact.

Examples of PVP, the most preferred organic, which may be used with this invention are shown below. PVP from other sources will also be satisfactory for use with the invention.

P2VP may be synthesized as follows:

Benzoyl peroxide (2.0 grams) is dissolved in freshly distilled 2-vinylpyridine (200 grams). Water (400 ml) is added and the mixture is purged with nitrogen for one hour. With continued purging, the mixture is heated at 85° C. with stirring and kept at that temperature for two hours. The organic phase will thicken and develop a brown color during this time. The mixture is cooled; the aqueous phase is discarded and the organic phase is dried overnight at 60° C. in a vacuum oven. The residue is ground into fine granules and dried to a constant weight at 60° C. in the vacuum oven. Yield 162 gm (81%) poly-2-vinylpyridine. This product can be expected to provide the following results upon analysis by gel permeation chromotography:

Weight—average molecular weight—555,000
Number—average molecular weight—199,000

P2VP is commercially available from the Ionac Chemical Co., Birmingham, Alabama: typical weight-—average molecular weight—301,000; typical Number—average molecular weight—128,000.

P4VP may be synthesized as follows:

Freshly distilled 4-vinylpyridine is purged with nitrogen for one hour. The 4-vinylpyridine is heated with stirring under a continuing nitrogen purge to 160° C. and maintained at that temperature for 90 minutes. The contents of the reactor will darken and thiken during this time until agitation becomes very difficult to maintain. The reaction product is then poured warm into a container for storage and tightly sealed.

The product can be expected to provide the following results upon analysis by gel permeation chromatography:

% volatiles (probably monomer)—34%

Average molecular weight—6000 (includes monomer).

P4VP may be obtained commercially from Polysciences, Inc., identified as #0112.

While a preferred embodiment has been described in detail, this has not been done for purposes of limitation but by way of illustration. The invention is intended to be defined by the following claims.

What is claimed is:

1. A method of preparing an anode for an electrochemical cell comprising the steps of:
   providing a lithium anode element having an operative surface area to be associated with a cathode;
   contacting at least the operative surface area of the anode element with organic material, and
   heating the anode element and organic material together to a temperature between at least about 260° F. and the melting temperature of the organic material.

2. The method of claim 1 wherein the anode element is held at the heating temperature for a predetermined period of time.

3. The method of claim 2 wherein the time is at least about one hour.

4. The method of claim 2 wherein the anode is cooled to room temperature after the heating step before any further preparation steps are carried out.

5. The method of claim 1 wherein the anode and contacting organic material are incorporated into a subassembly including an open cell container prior to the heating step and the entire subassembly is heated.

6. The method of claim 1 wherein the heating is by means of a forced air oven.

7. The method of claim 6 wherein the oven if preheated to a temperature between about 260° F. and about 310° F., the anode and contacting organic material are placed in the oven and heated to substantially the temperature at which the oven is maintained over a period of at least about 45 minutes to one hour and thereafter maintained at that temperature for at least about one hour.

8. The method of claim 7 wherein the anode element is removed from the oven following the heating step and cooled to room temperature before any further assembly operations are performed involving it.

9. The method of claim 1 wherein the organic material is in the form of a coating on the anode element.

10. The method of claim 1 wherein the organic material is in the form of a multi-layer coating on the anode element.

11. The method of claim 1 wherein the organic material is in the form of a self-supporting sheet.

12. The method of claim 1 wherein the heating temperature is about 295° F.±about 10° F.

13. The method of claim 12 wherein the heating is accomplished over a period of time of about two hours ±15 minutes.

14. The method of claim 1 wherein the heating temperature is between about 260° F. and 310° F.

15. The method of claim 1 wherein the organic material is a polyvinylpyridine polymer.

16. The method of claim 15 wherein the organic material is poly-2-vinylpyridine.

17. The method of claim 1 wherein the organic material is poly-2-vinylpyridine in the form of a coating on the operative surface area of the anode element and the heating temperature to which the coated anode is heated is about 295° F.±about 10° F.

18. The method of claim 17 wherein the heating is for a period of time of about 2 hours ±15 minutes.

19. The method of claim 17 wherein the coated anode element is held at the heating temperature for at least about one hour.

20. The method of claim 17 wherein the coated anode is incorporated into a subassembly including a cell container prior to the heating step and the entire subassembly is heated.

21. A method of making an electrochemical cell wherein the anode includes an operative surface area and the cathode comprises a charge-transfer complex material, comprising the steps:
   providing a lithium anode element having an operative surface to be associated with a cathode in a cell;
   contacting at least the operative surface of the anode element with organic material;
   heating the anode element and organic material to a temperature between at least about 260° F. and the melting temperature of the organic material;
   providing a cathode including a charge-transfer complex material, and
   assembling the anode and cathode in electrochemically operative relationship.

22. The method of claim 21 wherein a container is provided for the cell components, the anode and the contacting organic material are assembled into the container following which they are heated, and the cathode material is subsequently melted and poured into the container.

23. The method of claim 22 wherein the assembly is cooled prior to the addition of the cathode material.

24. The method of claim 21 wherein the cell is shorted across a resistor of about 0.1 to 0.2 ohms for a predetermined time following its assembly.

25. The method of claim 24 wherein the discharge is accomplished in two steps, the first step being discharge at a relatively high rate for a relatively short period of time; the second step being discharge at a relatively low rate for a relatively long period of time.

26. The method of claim 25 wherein the first step discharge is carried out across a resistor of about 0.1 to 0.2 ohms for a period of about one hour.

27. The method of claim 21 wherein the cathode comprises the reaction product of a mixture of polyvinylpyridine and iodine.

28. The method of claim 27 wherein the polyvinylpyridine is poly-2-vinylpyridine.

29. The method of claim 28 wherein the iodine and poly-2-vinylpyridine are present in a weight ratio greater than about 30:1.

30. The method of claim 29 wherein the weight ratio is about 50:1.

31. The method of claim 29 wherein the weight ratio is greater than 50:1.

32. The method of claim 29 wherein the weight ratio is about 100:1.

33. The method of claim 29 wherein the anode element is held at the heating temperature for a period of time.

34. The method of claim 33 wherein the time is at least about one hour.

35. The method of claim 33 wherein the anode is cooled to room temperature after the heating step before any further preparation steps are carried out on it.

36. The method of claim 21 wherein the anode and contacting organic material are incorporated into a subassembly including an open cell container prior to the heating step and the entire subassembly is heated.

37. The method of claim 21 wherein the heating is by means of a forced air oven.

38. The method of claim 37 wherein the oven is preheated to a temperature between about 260° F. and about 310° F., the anode and contacting organic material are placed in the oven and heated to substantially the temperature at which the oven is maintained over a period of about 45 minutes to about one hour and thereafter maintained at that temperature for about one hour.

39. The method of claim 39 wherein the anode element is removed from the oven following the heating step and cooled to room temperature before any further assembly operations are performed involving it.

40. The method of claim 21 wherein the organic material is in the form of a coating on the anode element.

41. The method of claim 21 wherein the organic material is in the form of a multi-layer coating on the anode element.

42. The method of claim 21 wherein the organic material is in the form of a self-supporting sheet.

43. The method of claim 21 wherein the heating temperature is about 295° F.±about 10° F.

44. The method of claim 21 wherein the heating temperature is between about 260° F. and 310° F.

45. The method of claim 21 wherein the organic material is a polyvinylpyridine polymer.

46. The method of claim 45 wherein the organic material is poly-2-vinylpyridine.

47. The method of claim 21 wherein the organic material is poly-2-vinylpyridine in the form of a coating on the operative surface area of the anode element and the heating temperature to which the coated anode is heated is about 295° F.±about 10° F.

48. The method of claim 47 wherein the coated anode element is held at the heating temperature for at least about one hour.

49. The method of claim 47 wherein the coated anode is incorporated into a subassembly including a cell container prior to the heating step and the entire subassembly is heated.

50. The method of claim 47 wherein the cell is discharged across a resistor of about 0.1 to 0.2 ohms for a predetermined time following its assembly.

51. The method of claim 50 wherein the discharge is accomplished in two steps, the first step being discharge at a relatively high rate for a relatively short period of time; the second step being discharge at a relatively low rate for a relatively long period of time.

52. The method of claim 47 wherein the cathode comprises the reaction product of a mixture of polyvinylpyridine and iodine.

53. The method of claim 47 wherein the polyvinylpyridine is poly-2-vinylpyridine.

54. The method of claim 47 wherein the iodine and poly-2-vinylpyridine are present in a weight ratio greater than about 30:1.

55. The method of claim 47 wherein the weight ratio is about 50:1.

56. The method of claim 47 wherein the weigth ratio is greater than 50:1.

57. The method of claim 47 wherein the weight ratio is about 100:1.

58. The method of claim 47 wherein the cell is discharged across a resistor of about 0.1 to 0.2 ohms for a predetermined time following its assembly.

59. The method of claim 54 wherein the resistance is about 0.1 ohms and the time is about one hour.

60. The method of claim 47 wherein the discharge is accomplished in two steps, the first step being discharge at a relatively high rate for a relatively short period of time; the second step being discharge at a relatively low rate for a relatively long period of time.

61. The method of claim 47 wherein the first step discharge is carried out across a resistor of about 0.1 to 0.2 ohms for a period of about one hour.

* * * * *